March 3, 1964 R. THOMPSON 3,122,901
UNIVERSAL JOINT ASSEMBLY
Filed July 20, 1962 2 Sheets-Sheet 1

INVENTOR.
RALPH THOMPSON
BY Wells & St. John
ATTYS.

March 3, 1964 R. THOMPSON 3,122,901
UNIVERSAL JOINT ASSEMBLY
Filed July 20, 1962 2 Sheets-Sheet 2

INVENTOR.
RALPH THOMPSON
BY
ATTYS.

United States Patent Office 3,122,901
Patented Mar. 3, 1964

---

3,122,901
UNIVERSAL JOINT ASSEMBLY
Ralph Thompson, Box 664, Glenns Ferry, Idaho
Filed July 20, 1962, Ser. No. 211,188
2 Claims. (Cl. 64—2)

This invention relates to a novel universal joint assembly.

The present invention is concerned with a universal joint assembly particularly designed for use on power take-offs between agricultural tractors and implements carried or drawn thereby. The mechanization of farm labor has been achieved primarily through the use of implements, either carried or drawn by farm tractors of various sizes and designs. Many implements are made by manufacturers not connected with a line of tractors and various lines of tractors are interchangeably utilized on single farms to operate implements made by other manufacturers. This interchangeability of implements is attained without standardization of the location of the power input shaft of the implement, nor of the power take-off shaft of the tractors. In order to accommodate an implement to a particular tractor it is common practice to utilize universal joints, coupled by a long connecting shaft. The particular arrangement of joints and bearings necessary to support such an assembly must be adjustable so as to accommodate any combination of implement and tractor. This requires time to effect such adjustment and often requires spare parts not generally available at the job site. The present invention provides a novel universal joint assembly for use at the power take-off of a tractor in order to adapt the drive connection to the driven connection of any farm implement.

It is a first object of this invention to provide a universal joint assembly which is usable in a wide variety of circumstances to join the power take-off of a tractor to the driven connection of a farm implement. The universal drive assembly is capable of accommodating movement between the two shafts during use of the implement, such as is the case in the instance of implements drawn behind the tractor. The joint assembly is capable of taking up the slack left by loose hitch connections, or the movement necessary between the two implements due to ground terrain.

Another object of this invention is to provide a universal joint assembly utilizing a plurality of universal joints so as to have a wide range of angular positions possible between the drive shaft and the driven shaft. In this connection it is a principal object of the invention to equalize the driving force at each universal joint by maintaining each in an equal angular position relative to the joint adjacent to it.

Another object of this invention is to provide such a universal joint assembly with a flexible casing which does not rotate and thereby provides a safety guard about the rotating universal joint elements.

These and further objects will be evident from a study of the following disclosure which illustrates a preferred form of the invention. It is to be understood that this form is exemplary and is not intended to limit or restrict the scope of the invention which is defined in the claims following this disclosure.

The present invention is designed to provide a universal joint assembly including a plurality of individual joints, each of which carries an equal driving load, and each of which is positioned at an equal angle relative to the adjacent joint. This is primarily accomplished by use of a surrounding non-rotatable spring which acts both as a protective guard for the assembly and also as a positioning element to correct angular irregularities between the joints and to prevent axial movement thereof.

Figure 1:
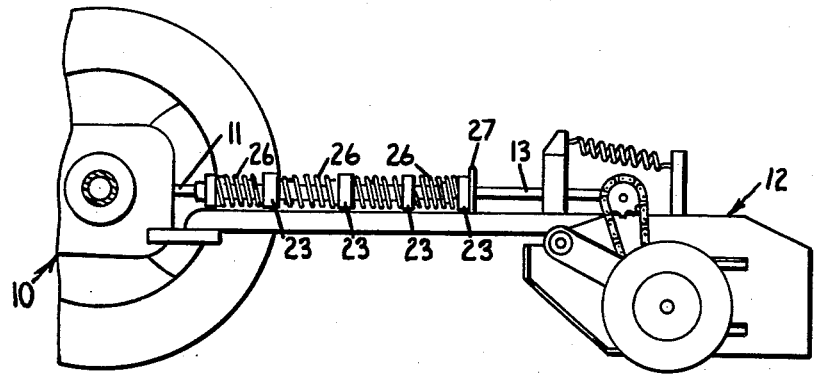
FIGURE 1 is a side view of the instant universal joint assembly showing its use between a farm tractor shown in section and an implement drawn thereby.

As illustrated in FIGURE 1, the universal joint assembly is adapted to be utilized between a tractor designated generally by the numeral 10, and an implement designated generally by the numeral 12. The tractor is provided with a conventional power take-off connection 11 at its rear end which normally consists of a rotatable splined shaft mounted on the tractor frame for rotation about its longitudinal central axis. The power take-off shaft is powered from the tractor motor by power transmission means. The implement 12 which is to be powered by the tractor 10 is conventionally provided with a driven shaft 13 which must be coupled to the power take-off 11.

Figure 2:
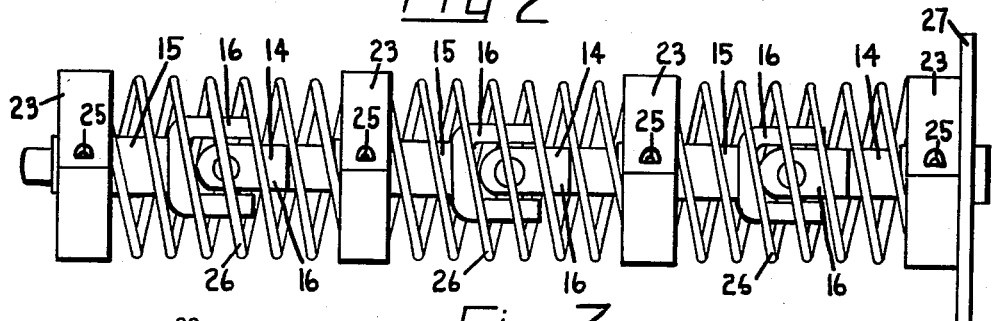
FIGURE 2 is an enlarged side view of the joint assembly illustrated in FIGURE 1.
Figure 3:
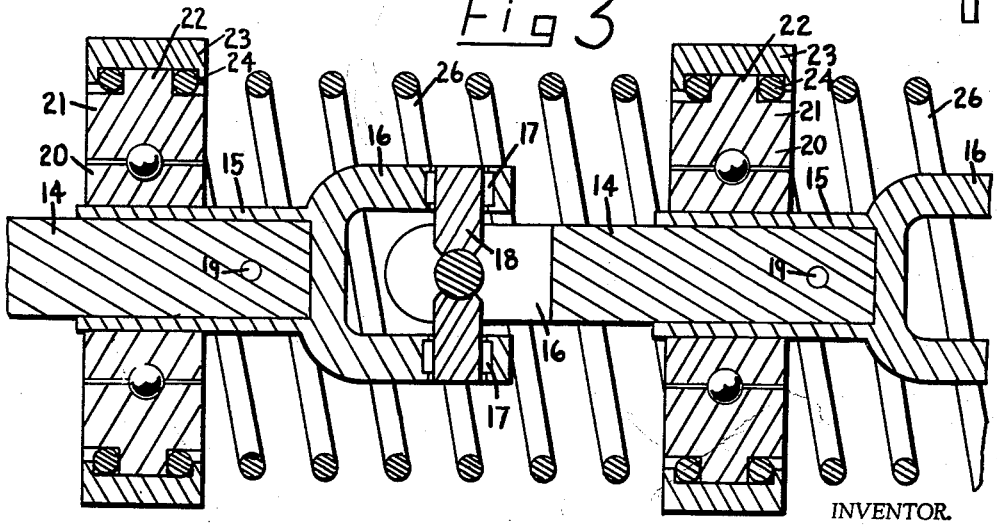
FIGURE 3 is an enlarged vertical sectional view taken through a representative portion of the joint assembly shown in FIGURE 2.
Figure 4:
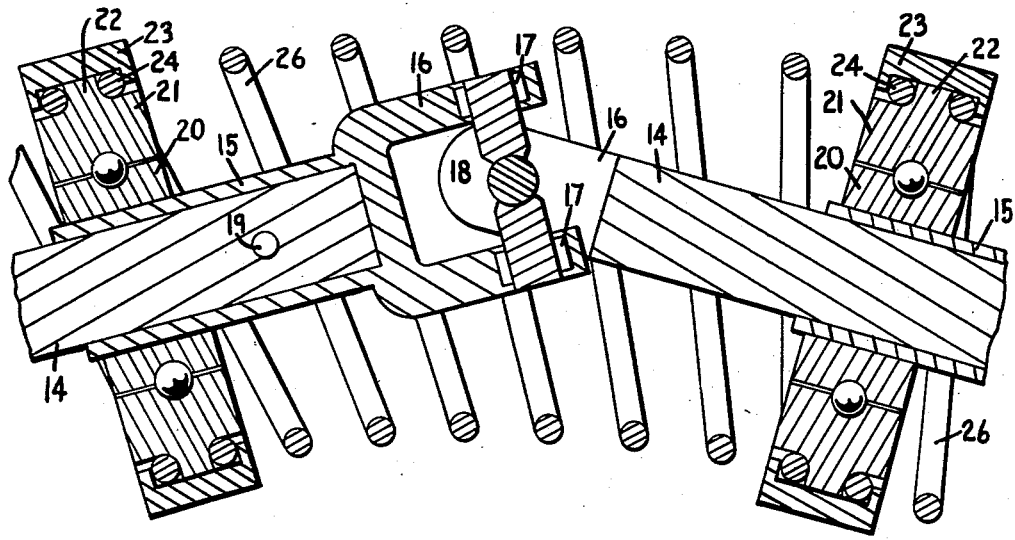
FIGURE 4 is a view similar to FIGURE 3 showing the bending of the joint assembly.
Figure 5:
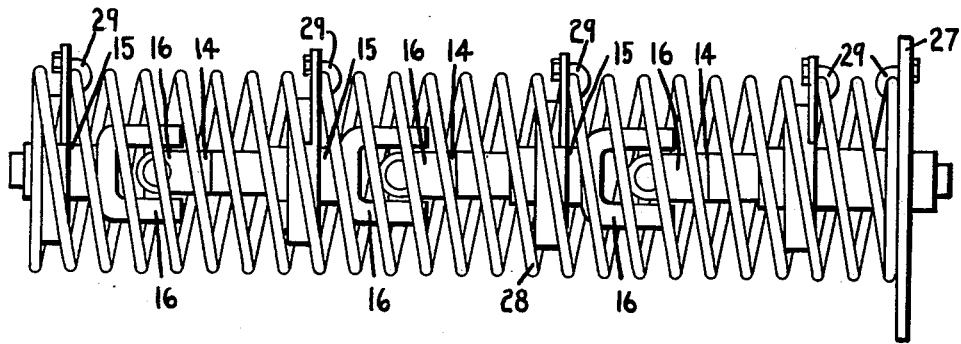
FIGURE 5 is a view similar to FIGURE 2, illustrating a slightly modified form of the invention.

Since a farm tractor such as that shown at 10 in FIGURE 1 must be adaptable to many implements such as implement 12, it is necessary to provide a flexible connection of some nature between the power take-off 11 and the driven shaft 13. The particular universal joint assembly used to effect this joinder is illustrated in detail in FIGURES 2, 3 and 4, with a slight modification being introduced in the device as illustrated in FIGURE 5.

The joint assembly comprises a chain of conventional universal joints, each of which includes a male member 14 and a female member 15. The members 14 and 15 are identical to one another with the exception that the outer connections are respectively as external mating surface and a complementary internal surface. A usable configuration for these surfaces is a square or other polygonal configuration. The members 14 and 15 are each provided with a divided yoke 16 which is pivotally carried by needle bearings 17 on a central trunnion 18. The adjacent members 14 and 15 are longitudinally connected by means of connecting pins 19.

The universal joint assembly such as just described is capable of transmitting rotational forces from one member 14 to the connected member 15 through the trunnion 18, while subtending angles relative to one another between 180 degrees and 140 degrees. Should an angle of less than 140 degeres be included between the connected members 14 and 15, the joint will be inoperative and damage will result. Thus where a wider turn is necessary it is essential that two or more universal joints be utilized. In such an instance, care must be provided to maintain each joint within its operative angular limits relative to the members of the joint. This is accomplished according to the present invention by means of a spring 26 wrapped about the several joint assemblies.

Each female member 15 is encircled at its joint with the adjacent male member 14 by a ball bearing having an inner race 20 fixed to the member 14. This inner race 20 further strengthens the relatively weak female connection of the member 15. The bearing further includes an outer race 21 rotatably mounted on the inner race 20 in a coaxial relationship with the longitudinal central axes of the members 14 and 15 coupled at its location. The outside circumference of race 21 includes a shoulder 22 which projects radially beyond the sides of the race 21.

Between each bearing is mounted a spring 26 which is fixed to the outer races 21 by means of split ring 23 having an internal spiral groove 24 within which the ends of the springs are clamped. The ring 23 is joined in position by means of recessed screws 25. It is to be understood that each spring 26 must be of substantially identical strength and construction in order that the biasing action of each spring shall be identical along the assembly. The springs are further provided with an anchor plate 27 at one or both ends which is adapted to be fixed to the frame of either the tractor 10 or the implement 12 or both. Thus the springs 27 are prevented from rotating about their longitudinal axes during driving of the several members 14 and 15 when connected to the power take-off 11. The springs 26 could not function as a flexible shaft but operate only as positioning elements to maintain the several bearings 20 and 21 in proper angular and axial positions relative to one another.

The springs 26 tend to bias the bearing members 21, and therefore the members 14 and 15, to a straight line position which is the normal configuration of the springs 26. Should the driven shaft 13 be offset from the power take-off 11, either angularly or axially, the difference will be taken up in the universal joint assembly with each individual joint subtending an equal angle due to the equal biasing force which will be exerted on the spring members 20 and 21. The maximum bending of the joint assembly can therefore be extremely great, and in practice, it has been found that an assembly having six joints can easily be more than doubled back upon itself. One tendency that occurs in a trunnion type of universal joint is the tendency of the joint to contract as the angles between the elements 14 and 15 lessen. The end pressure resulting on the members 14 and 15 will be reflected at the bearing members 20 and 21. Since the springs 26 will have a resistance to bending which increases as the angle of bend becomes greater, the end pressure exerted at each bearing outer race 21 will be equalized along the springs 26 so that each spring, and therefore each joint, will have a constant angle along the length of the assembly. A spring is particularly adaptable to this application because of its open nature which allows it to retain a circular cross section regardless of the angle of bend along its length. It is important in the practice of this invention that the interior diameter of the springs 26 not be less than the maximum width of the members 14 and 15 at the yokes 16. This clearance, in order to avoid rubbing of the parts, must be maintained throughout all allowable angles which may be subtended between connected yokes 16.

In FIGURE 5, I have illustrated a joint assembly identical to that shown in FIGURES 1 through 4, except that a single spring 28 is utilized along the entire length of the joint assembly. This spring 28 is clamped to the outer races 21 by means of bolts 29. Again it is necessary that the spring 28 be securely fixed to each bearing outer race 21 in order to maintain the equal pressure at each trunnion 18 and thereby spread the bending of the individual joints along the entire joint assembly.

The joint assembly constructed according to this invention requires no intermediate bearing fixed to the implement frame or the tractor frame. The assembly is not liable to whiplash since no one joint will be allowed to bend beyond its permissible range of approximately 40 degrees. The assembly is fully encased in a non-rotating spring which acts as a protective guard to maintain the safety of persons in the vicinity of the joint assembly. The assembly is extremely simple to dismantle for repair purposes and is easily maintained or assembled where desired. It is highly adaptable to any situation and may include any desirable number of individual joints depending upon the particular installation.

Various modifications can obviously be made in this device without deviating from the basic concept of a spring controlled chain of universal joints. Thus various forms of joints can be encased in the spring without changing the nature of the assembly. The weight of the various components must obviously be chosen in relation to the driving forces which they are to transmit.

Because of the many obvious modifications, the above disclosure is not intended to limit my invention which is defined in detail in the following claims.

Having thus described my invention, I claim:

1. A universal joint assembly for the power take-off connection of an agricultural device comprising;
   a plurality of universal joints drivingly connected to the power take-off connection in end to end relation, each joint including a pair of elements pivotally coupled for movement relative to one another about a pair of perpendicular axes;
   longitudinally spaced bearings located coaxially along said joints, each having a pair of independently rotatable races spaced by bearing members carried thereon, a first of which is fixed to one of said elements of each joint;
   axial spring means surrounding said joints, said spring means being fixed to the remaining race of each bearing, the interior diameter of said spring means being greater than the maximum width of said elements;
   and anchor means fixed to said spring adapted to be fixed to the frame of the device.

2. A universal joint assembly for the power take-off connection of an agricultural device comprising:
   a plurality of universal joints drivingly connected to the power take-off connection in aligned end to end positions, each joint including a pair of elements pivotally coupled for movement relative to one another about a pair of perpendicular axes, complementary adjacent elements being affixed to one another;
   longitudinally spaced bearings located coaxially along said joints at each joinder of complementary adjacent elements, each of said bearings having an inner race rotatably fixed to the elements upon which it is mounted and an outer race independently rotatable about the axis thereof, said inner and outer races being spaced by bearing members carried thereon;
   individual springs mounted between each pair of adjacent bearings in coaxial relation with the bearings and joint elements, said springs being fixed at each end thereof to the respective outer races of the bearings spanned thereby, the interior diameter of said springs being greater than the maximum width of the joint elements;
   and means fixed relative to said springs adapted to be fixed to the frame of the device.

References Cited in the file of this patent

UNITED STATES PATENTS

| | | |
|---|---|---|
| 486,852 | Coates | Nov. 29, 1892 |
| 497,590 | Moffat et al. | May 16, 1893 |
| 735,020 | Shedenhelm | July 28, 1903 |
| 2,793,512 | Larsen | May 28, 1957 |

FOREIGN PATENTS

| | | |
|---|---|---|
| 761,389 | Great Britain | Nov. 14, 1956 |